United States Patent
Yara et al.

(10) Patent No.: US 11,138,536 B1
(45) Date of Patent: Oct. 5, 2021

(54) INTELLIGENT IMPLEMENTATION PROJECT MANAGEMENT

(71) Applicant: ADP, LLC, Roseland, NJ (US)

(72) Inventors: Amarnath Yara, New York, NY (US); Nicholas Heasman, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/905,151

(22) Filed: Jun. 18, 2020

(51) Int. Cl.
*G06Q 10/06* (2012.01)

(52) U.S. Cl.
CPC . *G06Q 10/06313* (2013.01); *G06Q 10/06316* (2013.01)

(58) Field of Classification Search
None
See application file for complete search history.

(56) References Cited

U.S. PATENT DOCUMENTS

| | | | | |
|---|---|---|---|---|
| 8,086,710 B2 * | 12/2011 | Vanyukhin | ............ | H04L 41/00 709/223 |
| 10,789,265 B2 * | 9/2020 | Tiwari | ............ | G06F 3/0647 |
| 2014/0172782 A1 * | 6/2014 | Schuenzel | ............ | G06F 3/0605 707/609 |
| 2014/0278808 A1 * | 9/2014 | Iyoob | ............ | G06Q 30/0206 705/7.35 |
| 2014/0317166 A1 * | 10/2014 | Iyoob | ............ | G06Q 40/00 709/201 |
| 2016/0092813 A1 * | 3/2016 | Baker | ............ | G06Q 10/06313 705/7.23 |
| 2016/0098470 A1 * | 4/2016 | Richman | ............ | H04L 67/34 709/203 |

(Continued)

FOREIGN PATENT DOCUMENTS

| | | | | |
|---|---|---|---|---|
| AU | 2013273685 B2 * | 7/2015 | ........... | G06F 3/0605 |
| AU | 2018260855 B2 * | 7/2020 | ........... | G06F 9/5088 |

(Continued)

OTHER PUBLICATIONS

Haller, Klaus. "Data migration project management and standard software-experiences in avaloq implementation projects." Synergien durch Integration und Informationslogistik (2008). (Year: 2008).*

(Continued)

*Primary Examiner* — Matthew S Gart
*Assistant Examiner* — Derick J Holzmacher
(74) *Attorney, Agent, or Firm* — Yee & Associates, P.C.

(57) ABSTRACT

A method of project management is provided. The method comprises receiving identity of a number of customers requiring data migration and receiving a target completion date for data migration for each customer. A number of data migration implementations are identified for all customers. A number of tasks required for each implementation is calculated, as is a required time for completion of each task. A number of people are then identified from a candidate pool to assign to complete the implementations. An estimated completion date is calculated for data migrations for each customer according to a total required time for all implementations and the number of people assigned to complete the implementations. The target completion date and estimated completion date for each customer are displayed in a user interface.

31 Claims, 9 Drawing Sheets

(56) References Cited

U.S. PATENT DOCUMENTS

| | | | | |
|---|---|---|---|---|
| 2017/0351716 A1* | 12/2017 | Higginson | ............ | G06F 16/285 |
| 2019/0108223 A1* | 4/2019 | Fabijancic | ............ | G06F 16/212 |
| 2019/0130341 A1* | 5/2019 | Derrico | ................ | G06Q 10/067 |
| 2019/0182323 A1* | 6/2019 | Srinivasan | ............ | G06F 9/4856 |
| 2019/0197171 A1* | 6/2019 | Tiwari | .................. | G06F 3/0647 |
| 2020/0007579 A1* | 1/2020 | Barday | ............... | H04L 63/1491 |
| 2020/0104375 A1* | 4/2020 | Earnesty, Jr. | ....... | G06F 11/3065 |

FOREIGN PATENT DOCUMENTS

| | | | | |
|---|---|---|---|---|
| EP | 3495951 A1 * | 6/2019 | ......... | G06Q 10/0631 |
| WO | WO-2013123097 A1 * | 8/2013 | ............ | H04L 51/22 |
| WO | WO-2016138474 A1 * | 9/2016 | ........... | G06F 3/0689 |

OTHER PUBLICATIONS

Velimeneti, Sushma. "Data Migration from Legacy Systems to Modern Database." (2016). (Year: 2016).*

Haryani, Calandra Alencia, et al. "Migration application from waterfall to agile environments for effectiveness and efficiency strategy." (2018): 570-577. (Year: 2018).*

Gueorguiev, Stefan, Mark Harman, and Giuliano Antoniol. "Software project planning for robustness and completion time in the presence of uncertainty using multi objective search based software engineering." Proceedings of the 11th Annual conference on Genetic and evolutionary computation. 2009. (Year: 2009).*

* cited by examiner

FIG. 7

Implementations
Client Pipline   Implementation Status Dashboard   Client Implementations

Implementation Status Dashboard
Here you can view all current and past implementation performance details to help with your service planning.

- 3 — 720 — Client at Risk
- 7 — 722 — Client Implementations at Risk
- 29 — 724 — People Needed To Complete / All Implementations on Time — 702

[Actions ▼]

Clients

- ▲ ADP Live
- ▲ ADP Private Limited
- ▼ ADPR Test Client — 708

| Country | Target Go Live 708 | Delivery 710 | Projected Go Live 712 | Team Size 714 | Actual Go Live Data 716 | Effort (Hours) 718 |
|---|---|---|---|---|---|---|
| United States | 02/11/2019 | All Risk | 03/01/2019 | 2 | Pending... | 103 |
| Canada | 02/11/2019 | On Track | 02/09/2019 | 14 | 4/3/2019 | 739 |
| Australia | 02/11/2019 | On Track | 02/09/2019 | 15 | 4/3/2019 | 739 |
| Great Britain | 02/11/2019 | All Risk | 03/01/2019 | 14 | Pending... | 103 |

- ▲ Authorization Test Client
- ▲ BAT Client
- ▲ CLM BMA TMA Test
- ▲ EXL Demo

Tabs: Client Management | Dashboard  Clients  Administrators  Implementations  Business Mini Apps  Reports  Billing  Templates 700
704
706

ADPR Test Client
Implementation (United States)

| Lead Client Instance Admin | Status | Complete |
|---|---|---|
| Jhoanna Wang | In Progress | 37% |

Dashboard    Provisioning + Configuration    Implementation Team

---

Provisioning + Configuration
Below are all the provisioning and configuration steps required to get up and running!

| Business Mini App | Domain | Tasks | Assigned To |
|---|---|---|---|
| Search... 🔍 | All ▼ | All ▼ | All 🔍 |

---

| | Business Mini App  802 | | Complete | |
|---|---|---|---|---|
| ▶ | 🔗 Agile Org (1.0.0) | | 50% | ○ ○ ○ |
| ▶ | 🎂 Anniversary Reminder (1.0.0) | | 50% | ○ ○ ○ |
| ▼ 804 | ADP Autopay Adapter (1.0.0) | | 0% | ○ ○ ○ |

| Step | Type 808 | Task 810 | Status 812 | Assigned 814 | | |
|---|---|---|---|---|---|---|
| 1 | Provision | Create Company Codes in Oracle | Not started | (JW) Jhoanna Wang | Undo | ○ ○ ○ |
| 2 | Provision | Create Autopay Instance | Not ready ⓘ | (AB) Anita Baker | [Launch] [Done] | ○ ○ ○ |
| 3 | Configure | Configure some stuff | Not ready ⓘ | Not assigned Assign | [Launch] [Done] | ○ ○ ○ |
| 4 | Configure | Another step here (possibly not dependent on step 3) | Not started | Not Assigned Assign | [Launch] [Done] | ○ ○ ○ |

806

| ▶ | 🌐 Global Core HR (1.5.0) | 50% | ○ ○ ○ |
|---|---|---|---|
| ▶ | 🎬 Global Payroll Front End (1.0.0) | 25% | ○ ○ ○ |

TO FIG. 8B

INTELLIGENT IMPLEMENTATION PROJECT MANAGEMENT

BACKGROUND INFORMATION

1. Field

The present disclosure relates generally to project management and, in particular, to calculating an estimated completion date for data migrations according to required time for all implementations and the number of people assigned to complete the implementations.

2. Background

Project management is the practice of leading a work team to produce a product or implement a service within specific constraints such as cost and time. In contrast to business as usual day-to-day operations, project management relates to unique, temporary endeavors with a defined beginning and end. An example of this contrast is the building of a factory versus running the factory thereafter. In the field of data management and information technology, the contrast is illustrated by setting up services for a customer or updating those services versus providing those services on a day-to-day basis.

SUMMARY

An illustrative embodiment provides a computer-implemented method for project management. The method comprises receiving identity of a number of customers requiring data migration and receiving a target completion date for data migration for each customer. A number of data migration implementations are identified for all customers. A number of tasks required for each implementation is calculated, as is a required time for completion of each task. A number of people are then identified from a candidate pool to assign to complete the implementations. An estimated completion date is calculated for data migrations for each customer according to a total required time for all implementations and the number of people assigned to complete the implementations. The target completion date and estimated completion date for each customer are displayed in a user interface.

Another illustrative embodiment provides a system for project management. The system comprises a storage device configured to store program instructions and one or more processors operably connected to the storage device and configured to execute the program instructions to cause the system to: receive identity of a number of customers requiring data migration; receive a target completion date for data migration for each customer; identify a number of data migration implementations for all customers; calculate a number of tasks required for each implementation; calculate a required time for completion of each task; identify a number of people from a candidate pool to assign to complete the implementations; calculate an estimated completion date for data migrations for each customer according to a total required time for all implementations and the number of people assigned to complete the implementations; and display the target completion date and estimated completion date for each customer in a user interface.

Another illustrative embodiment provides a computer program product for project management. The computer program product comprises a computer-readable storage medium having program instructions embodied thereon to perform the steps of: receiving identity of a number of customers requiring data migration; receiving a target completion date for data migration for each customer; identifying a number of data migration implementations for all customers; calculating a number of tasks required for each implementation; calculating a required time for completion of each task; identifying a number of people from a candidate pool to assign to complete the implementations; calculating an estimated completion date for data migrations for each customer according to a total required time for all implementations and the number of people assigned to complete the implementations; and displaying the target completion date and estimated completion date for each customer in a user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 illustrates an interface displaying a dashboard for tracking implementation in accordance with an illustrative embodiment;

FIGS. 8A and 8B are illustrations of an interface showing implementation steps for each implementation of data migration in accordance with an illustrative embodiment.

DETAILED DESCRIPTION

The illustrative embodiments recognize and take into account one or more different considerations. The illustrative embodiments recognize and take into account that project management typically lacks tool that allow accurate projection of customer completion dates.

The illustrative embodiments also recognize and take into account that project management typically does not provide timely visibility regarding current engagements at the staff level and current, ongoing implementations. Institutionally, this lack of visibility into projects and accurate projection of completion dates can produce a gap between sales and implementation, resulting in overpromising and underdelivering to customers.

The illustrative embodiments provide a client management method and system that compares historical implementation data to available implementation tasks for a given customer and calculates work effort and delivery timeframes based on customer data complexity and implementation priorities.

Figure 1:
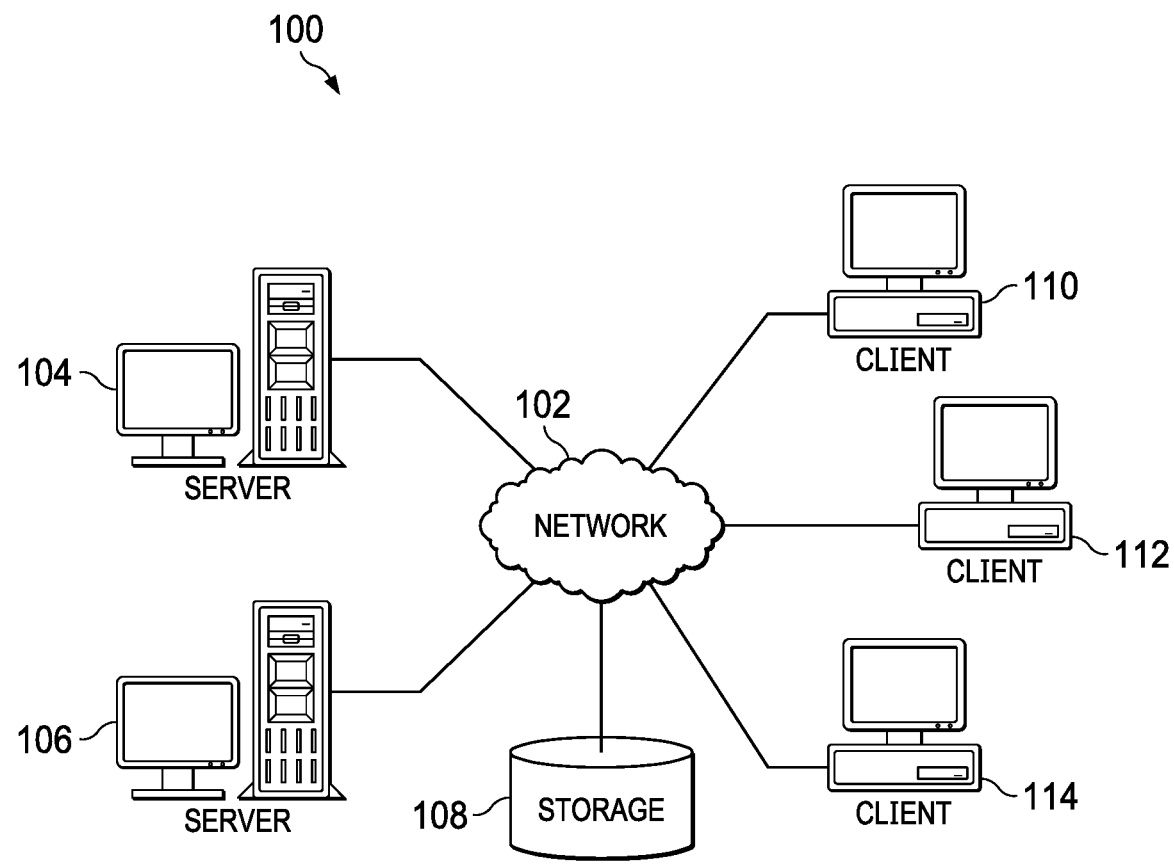
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, customer computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
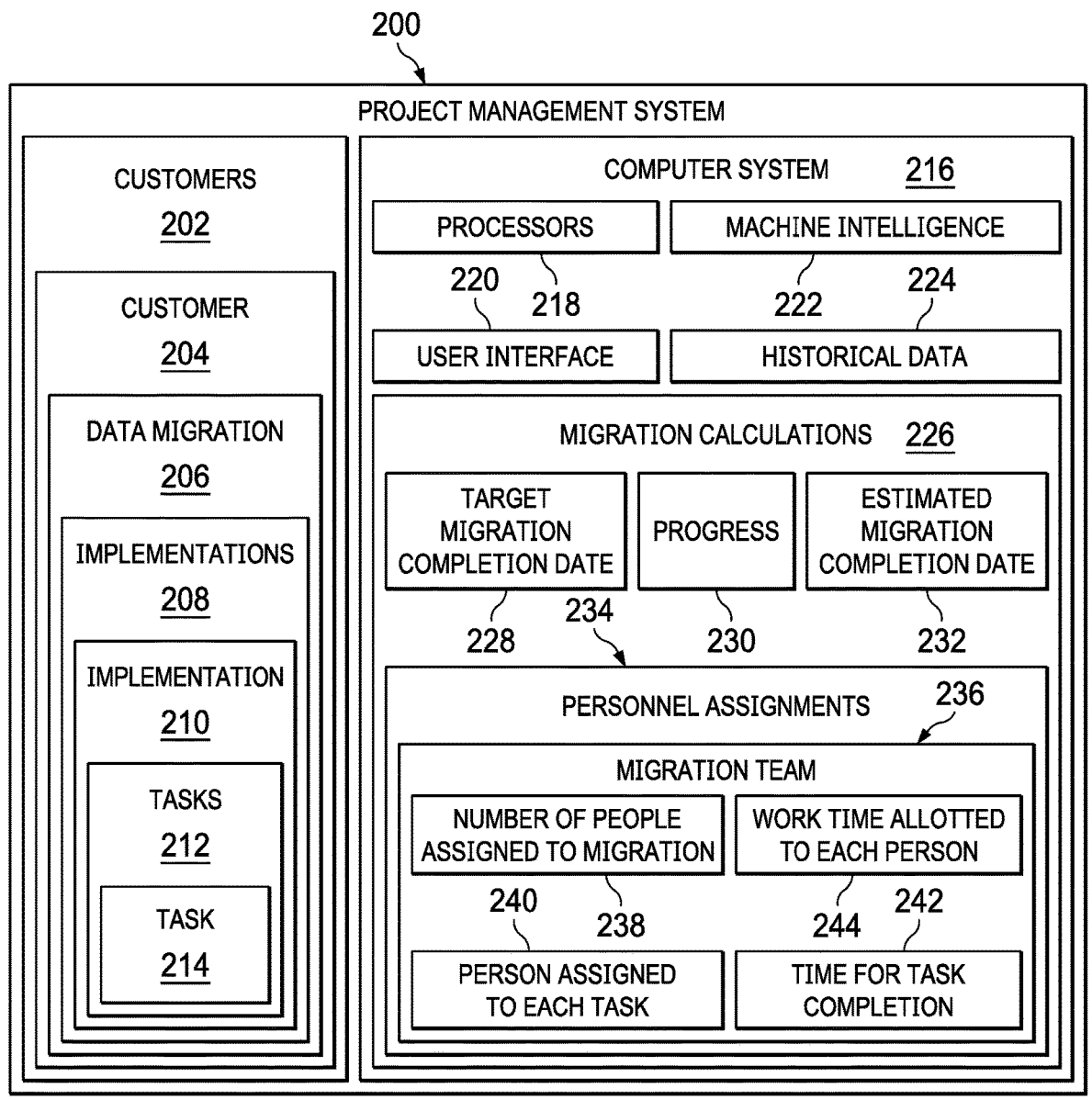
FIG. 2 is an illustration of a block diagram of a computer system for project management in accordance with an illustrative embodiment.

Turning to FIG. 2, a block diagram of a computer system for project management is depicted in accordance with an illustrative embodiment. Project management system 200 might be implemented in network data processing system 100 shown in FIG. 1.

Product management system comprises information about a number of customers 202. Each customer 204 requires a data migration 206. This data migration 208 might comprise a number of implementations 208 for different applications or updates for applications. For example, a customer might require a payroll implementation, a human resources (HR) implementation, and a benefits implementation as part of its data migration. Implementations 208 might be customer-specific or cross-customer implementations in which migrations for a number of customers are performed for the same application.

Each implementation 210 comprises a number of tasks 212 that need to be performed as part of the data migration. Each individual task 214 requires a certain amount of time to complete.

Computer system 216 comprises a number of processors 218 that perform a number of migration calculations 226 related to each migration. Migration calculations 226 help to determine when a data migration project will be completed and the resources necessary to accomplish the migrations within a specified time period.

To enable more accurate migration calculations 226, computer system 216 might employ machine intelligence 222 to implement machine learning processes. This machine learning might be based on historical data 224 that comprises information about past migration projects as well as past performance of staff personnel implementing those migrations.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines. In the illustrative embodiments, historical data 224 can be used as a labeled dataset to train machine intelligence 222.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria. As historical data 224 is updated through operational experience, it can be used to refine and update machine intelligence 222.

Each data migration 206 is assigned a target completion date 228. Personnel assignments 234 determine personnel and resource allocations to a data migration and determine if a data migration will meet the target completion date 228.

Each data migration 206 has an assigned migration team 236. Migration team 236 comprises a number of people assigned to the migration 238 in question. A specific person 240 is assign to each task 214. Each task in turn has a calculated time for task completion 242. Each person on the migration team has a total work time assigned 244. The total work time might comprise the total amount of work to be performed based on the calculated time for each task completion 242 and the number of tasks assigned to that person. Alternatively, work time allotted 244 might comprise a total amount of time to spend working on the data migration.

From the calculations provided by the personnel assignments 234, computer system 216 is able to estimate a migration completion date 232, which may or may not match the original target completion date 228. If the estimated migration completion date 232 does not match the target completion date 228, resources and personnel can be reallocated, or timetables can be adjusted to compensate for the discrepancy.

As the data migration is being conducted, its progress 230 can be monitored dynamically. The migration calculations can be displayed in interface 220, allowing a user to monitor the progress 230 of tasks 212 comprising a data migration 206, as well as the personnel and resources allocated to the migration. Through the interface 220, the user can adjust personnel assignments 234 or the target completion date 228 as necessary.

The illustrative embodiments solve the technical problem of providing users with a high granularity of information about the progress of a data migration project and the ability to anticipate potential delays and adjust resource allocations and/or time tables in order to keep the project on schedule before waiting until problems and delays occur.

Project management system 200 can be implemented in software, hardware, firmware, or a combination thereof. When software is used, the operations performed by project management system 200 can be implemented in program code configured to run on hardware, such as a processor unit. When firmware is used, the operations performed by project management system 200 can be implemented in program code and data and stored in persistent memory to run on a processor unit. When hardware is employed, the hardware may include circuits that operate to perform the operations in project management system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

Figure 3:
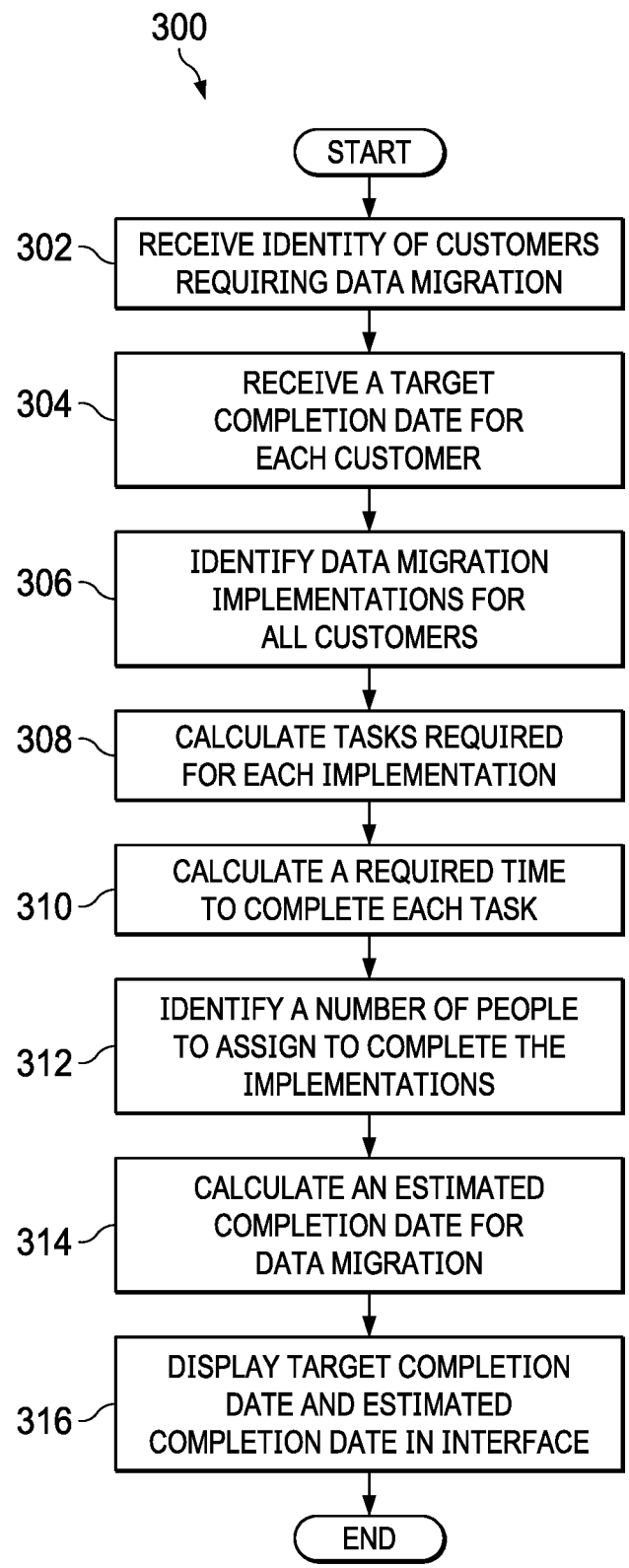
FIG. 3 is an illustration of a flowchart for a process of project management in accordance with an illustrative embodiment.

FIG. 3 is an illustration of a flowchart for a process of project management in accordance with an illustrative embodiment. The process in FIG. 3 can be implemented in hardware, software, or both. When implemented in software, the process can take the form of program code that is run by one of more processor units located in one or more hardware devices in one or more computer systems. Process 300 might be implemented with project management system 200.

Process 330 begins with receiving the identity of customers requiring data migration (step 302). Also received is a target completion date for each customer (step 304).

Process 300 then identifies migration implementations for all customers (step 306). Different customers might require the same migration implementations or different implementations for different applications. Some customers might also have more or less applications requiring data migration than other customers.

Process 300 calculates a number of tasks required for each implementation (step 308). Tasks can be thought of as the fundamental steps or building blocks comprising a migration implementation. Process 300 then calculates a required time for completion of each task of each implementation (step 310). The required time can be based on both historical task durations from past migration projects as well as the complexity of customer data.

By determining the number implementations, the number of tasks for each implementation, and the time required to complete each task, process 300 is able to calculate the total amount of time (i.e., man hours) necessary to complete a data migration project. That time is then allocated among staff personnel for completion.

Process 300 identifies a number of people from a staff candidate pool to assign to complete the implementations (step 312). These people constitute the migration team 236. Each person assigned to an implementation might be allotted a specified total amount of work time. This allotted work time might be a total amount of work to perform, which is represented as the time required to complete the work, or the allotted work time might comprise the total amount of time the person is authorized to spend working on the implementation. For example, a person on the migration team might only be allotted three hours to spend on tasks for a given implementation, or each person might have a maximum number of allowed work hours. The implementations to which staff personnel are assigned might be for a single customer or multiple customers requiring the same type of migration.

From the total time required for all implementations and the number of people assigned to complete the implementations, process 300 calculates an estimated completion date for data migrations for each customer (step 314). Forecasting accurate completion dates can be based on historical durations as compared to available migration team capacity. Projected timelines enable decisions makers to communicate accurate delivery estimates to customers and plan for workforce headcount changes to achieve desired results.

The target completion date and estimated completion date for each customer are displayed in a user interface (step 316). Process 300 then ends.

Displaying the target and estimated completion dates allows a user to spot a discrepancy between the dates and make adjustments to project resources in order to address the discrepancy. The information displayed for each customer in the respective user interface might also comprise the number of people assigned to complete the implementations, a total work time completed on the implementations, and a completion risk rating according to a comparison of the target completion date and estimated completion date.

Previously migrated data might be refreshed at periodic intervals while data migration for a customer is still in progress.

Figure 4:
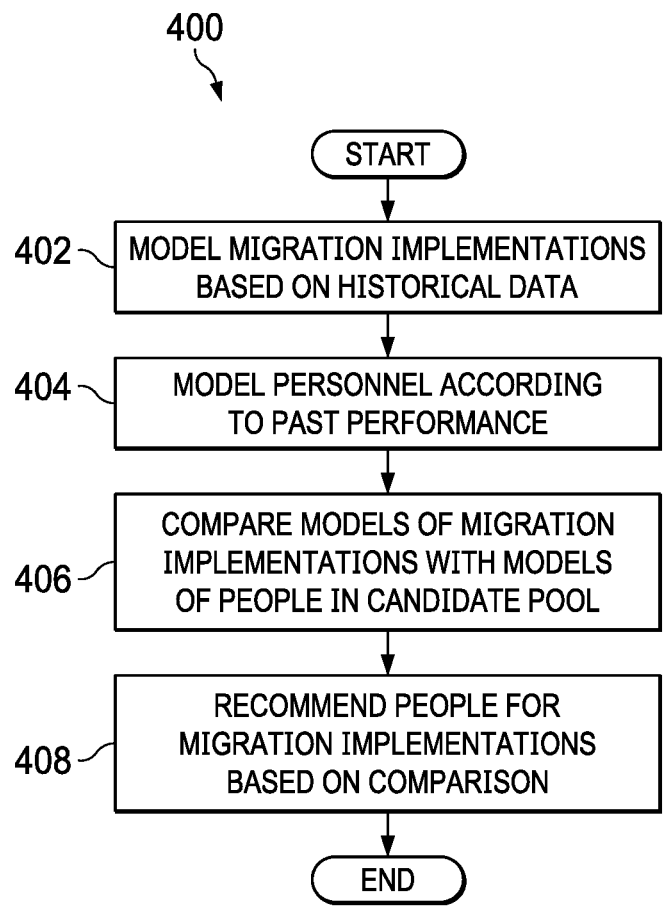
FIG. 4 is an illustration of a flowchart for a process of recommending personnel for migration implementations in accordance with an illustrative embodiment.

FIG. 4 is an illustration of a flowchart for a process of recommending personnel for migration implementations in accordance with an illustrative embodiment. The process in FIG. 4 can be implemented in hardware, software, or both. When implemented in software, the process can take the form of program code that is run by one of more processor units located in one or more hardware devices in one or more computer systems. Process 400 might be implemented are part of step 312 in process 300.

Process 400 can be performed with machine intelligence 222 and historical data 224 to model the migration implementations based on historical data comprising information about past migration projects. Process 400 begins by modeling the migration implementations based on historical data comprising information about past migration projects (step 402). Machine intelligence 222 can use machine learning to model different scenarios regarding implementation workflows and completion timetables for different types of migration projects based on historical task durations as well as customer data complexity.

Process 400 the models the performance of people in the staff candidate pool according to historical data of their past performance (step 404). Machine intelligence 222 can analyze performance of people in the candidate pool according to historical data 224 of their performance on previous migration projects.

Process 400 then compares models of the migration implementations with models of people in the candidate pool (step 406) and recommends people from a candidate pool who are best suited to the migration implementations based on the comparison (step 408). Process 400 then ends.

In response to continued monitoring of a migration implementation (see FIG. 6 below), process 400 might operate on the fly, comprising adding or removing personnel from the migration team as circumstances and personnel change. For example, people might be added to the migration team to get a project back on schedule or to replace team members who have left to prevent a project from falling behind schedule. Machine intelligence 222 can recommend candidates on the fly according the machine learning modeling described above, thereby optimizing the selection of appropriate candidates and minimizing delay time in identifying replacement candidates.

Figure 5:
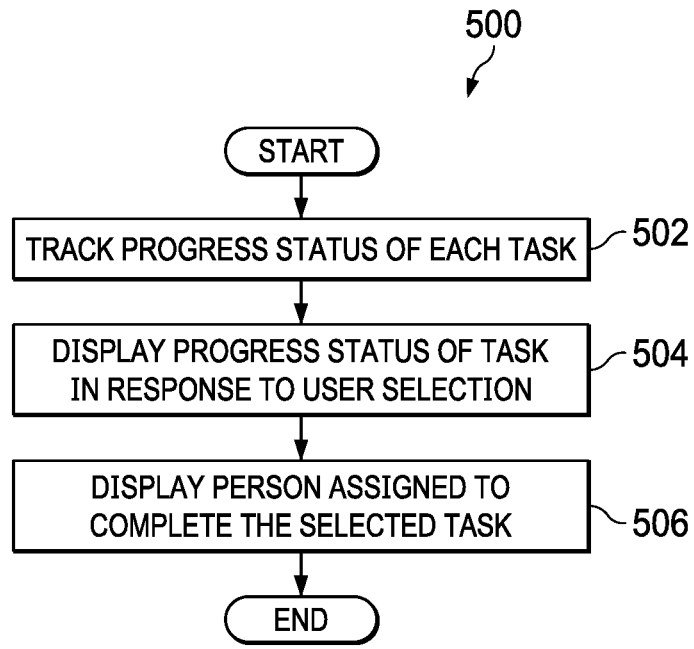
FIG. 5 is an illustration of a flowchart for a process of tracking progress of a data migration in accordance with an illustrative embodiment.

FIG. 5 is an illustration of a flowchart for a process of tracking progress of a data migration in accordance with an illustrative embodiment. The process in FIG. 5 can be implemented in hardware, software, or both. When implemented in software, the process can take the form of program code that is run by one of more processor units located in one or more hardware devices in one or more computer systems. Process 500 might be a more detailed implementation of step 316 in FIG. 3.

Process 500 dynamically tracks a progress status of each task comprising each implementation (step 502). In response to a user selection of an implementation task, process 500 displays in the user interface the progress status of the selected implementation task (step 504). Process 500 might also display the identity of the person assigned to complete the selected implementation task (step 506). Process 500 then ends.

Figure 6:
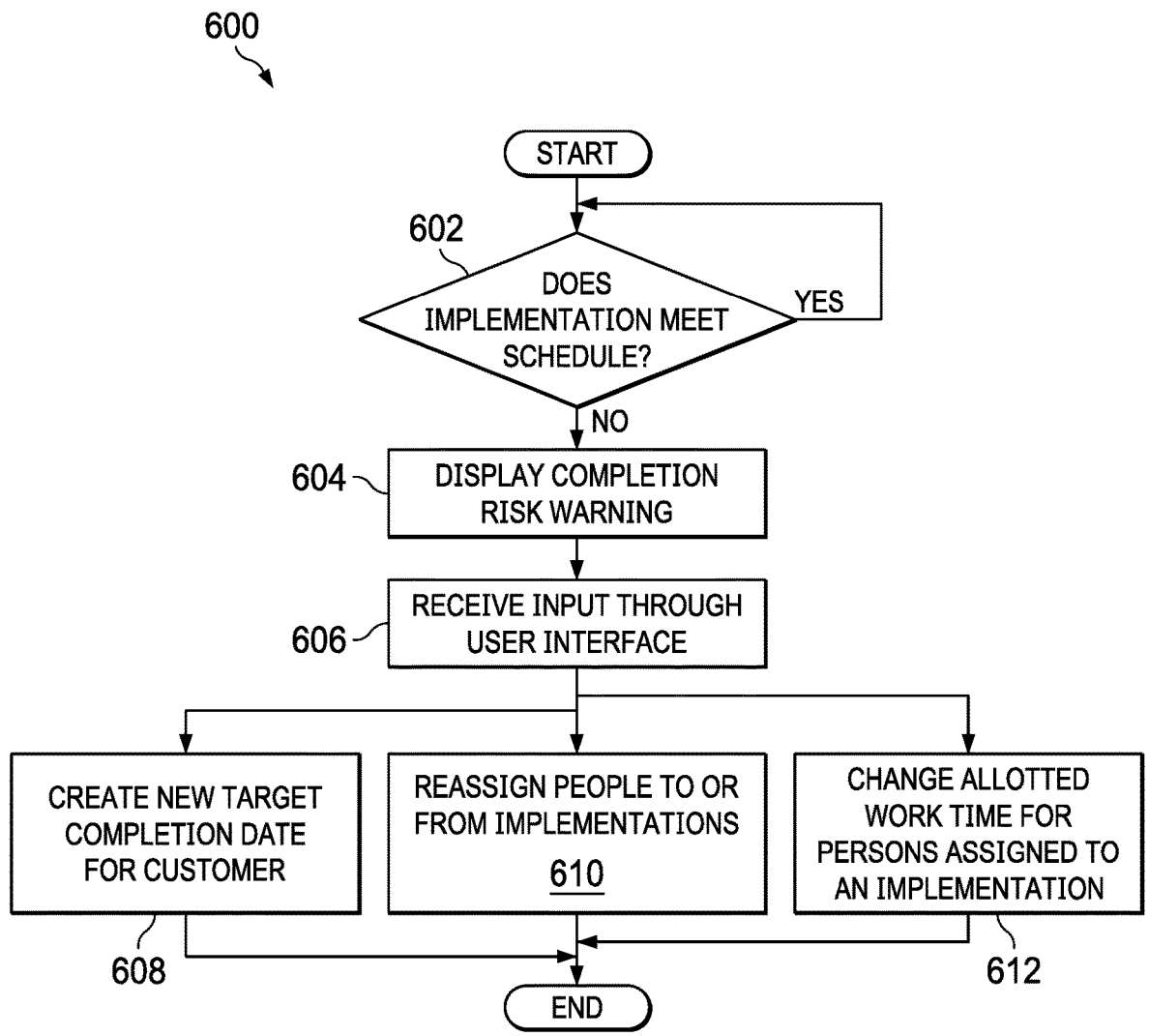
FIG. 6 is an illustration of a flowchart for a process of adjusting resource allocation for a data migration in accordance with an illustrative embodiment.

FIG. 6 is an illustration of a flowchart for a process of adjusting resource allocation for a data migration in accordance with an illustrative embodiment. The process in FIG. 6 can be implemented in hardware, software, or both. When implemented in software, the process can take the form of program code that is run by one of more processor units located in one or more hardware devices in one or more computer systems. Process 600 might be an extension of process 300 in FIG. 3.

After calculating the estimated migration completion date in step 314 in FIG. 3, and in response to dynamic tracking of progress status in step 502 in FIG. 5, process 600 continually monitors the status of a migration implementation to determine if the implementation meets the schedule of the original target completion date (step 602). If the implementation does not meet the target schedule, the interface might display an implementation risk warning in the interface in order to alert a user (step 604). The risk warning provides the user an opportunity to proactively alter the parameters of a migration implementation.

If the user chooses to alter the parameters of an implementation, an input is received through the user interface (step 606). The user might make a number of changes to the implementation. If insufficient resources are available to meet the original target completion, the user might create a new target completion date (step 608).

The user might also assign people to or from different implementations (step 610). For example, if each person assigned to the implementation has already been allotted a maximum allowed work time or if an implementation is falling behind schedule, the user can assign additional people from the staff candidate pool to the implementation. As another example, if a person leaves a migration team for whatever reason, the user can assign a new person to the team to keep the migration implementations on schedule. Step 610 might utilize machine intelligence 222 similarly to step 312 in process 300 and process 400 in FIG. 4. By modeling the migration workflow, including delays, machine intelligence 222 can recommend staff personnel who are best suited to add to the migration team to put a project back on schedule. Similarly, if a person leaves a migration team for whatever reason, machine intelligence 222 can recommend a replacement person to the user from the candidate pool to keep a migration project on schedule.

The user might also choose to change the allotted work time for persons assigned to an implementation (step 612). This step might comprise increasing the total work time allotted to the person or reallocating work time for the person between different implementations if the other implementations are on schedule.

Using the interface, a user might make any or all of changes 608-612 in process 600. Process 600 then ends.

FIG. 7 illustrates an interface displaying a dashboard for tracking implementation in accordance with an illustrative embodiment. Interface 700 might be an example of interface 220 in FIG. 2.

Interface 700 provide a list of customers 702 for with data migration implementations are being performed. By selecting a particular customer 704, interface 700 produces a dropdown menu of different countries 706 in which implementations are being performed for that customer. For each country, interface provides a target go live (completion) date 708, a projected (estimated) go live date 712, and an actual go live date 716. The actual go live date 716 helps to determine how accurate the projected go live date 712 is and acts as a guideline to adjust resources to meet the target go live date 708, as well as reset customer expectations if the target go live date 708 cannot be met.

Also provided in interface 700 is a deliver risk indication 710. If the projected completion date 712 matches or is earlier than the target go live date 708, the implementation is designation as on track. However, if the projected completion date 712 later than the target go live date 708, the implementation is designation as at risk to alert the user monitoring the progress of the implementations.

Interface 700 lists the team size (number of people) 714 assigned to each country implementation and the effort in total number of estimated hours 718 required for each implementation, which can be divided among the people on the team.

Interface 700 also indicates the number of customers at risk of not having data migrations completed on time 720, the number of customer implementations at risk 722, and the number of people needed to complete all implementations on time.

Figure 8B:
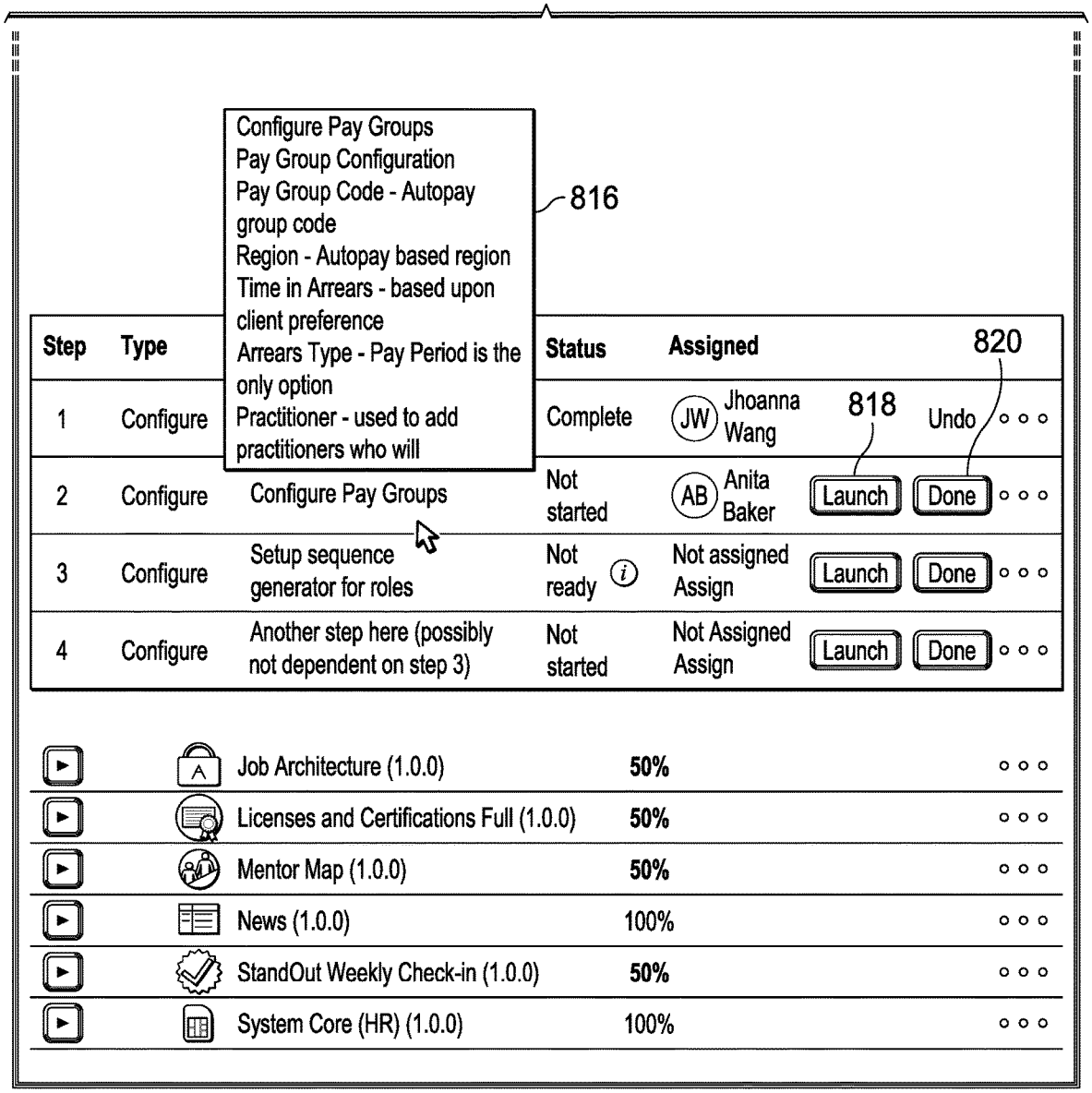

FIGS. 8A and 8B are illustrations of an interface showing implementation steps for each implementation of data migration in accordance with an illustrative embodiment. Interface 800 might be an example of interface 220 in FIG. 2. Interface 800 might be reached by selecting a country implementation 706 in interface 700.

Interface 800 displays a number of applications 802 requiring data migration. By selecting a specific application 804, interface 800 produces a dropdown menu of all steps/tasks 806 required for the data migration implementation for that application.

For each task of an implementation, interface 800 describes the type 808 of the task and a description 810 of the task. Interface 800 might also provide an indicator of the current status 812 of each task (e.g., not started, complete, not ready), and the person 814 assigned to complete the task.

When a user places a cursor over a task, interface 800 might pull up a description 816 of details associated with the task in question. Clicking on launch button 818 opens a user interface to work on a task, e.g., to setup configuration, import customer data etc. Done button 820 is used to mark a particular task as done/completed.

Figure 9:
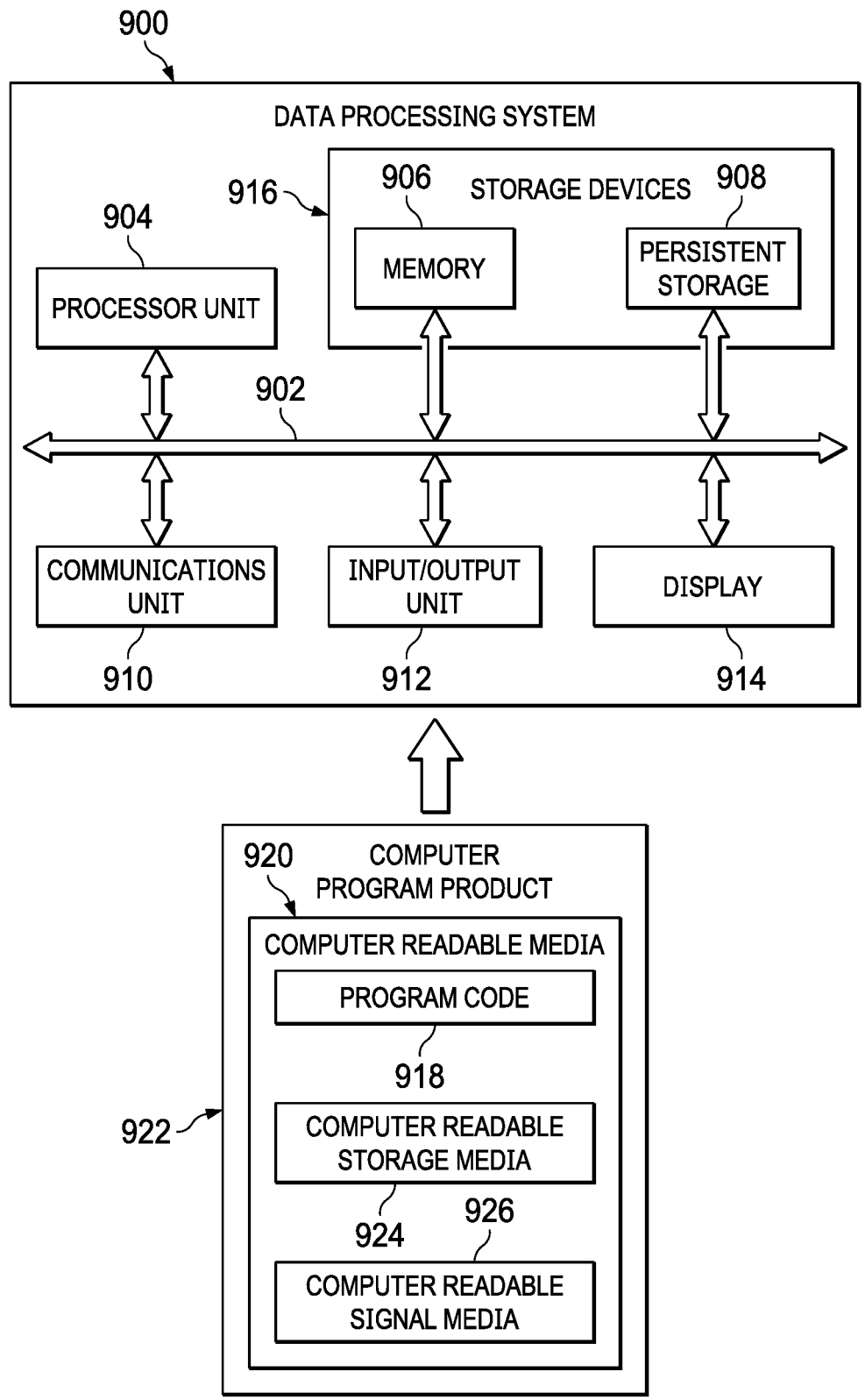
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers and customer computer system 112 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for automated project management, the method comprising:
   using a number of processors of a machine learning predictive modeling system to perform the steps of:
      receiving identity of a number of customers requiring data migration;
      receiving a target completion date for data migration for each customer;
      identifying a number of data migration implementations for all customers;
      performing iterative analysis based on machine learning with a training data based on a historical data set to construct a predictive model;
      updating the training data responsive to changes in the historical data set re-training the predictive model with the updated training data;
      determining, with the predictive model, a number of tasks required for each implementation;
      determining, with the predictive model, a required time for completion of each task;
      identifying, with the predictive model, a number of people from a candidate pool to assign to complete the data migration implementation;
      assigning, with the predictive model, a candidate from the number of people identified, to an implementation team for the data migration implementation;
      calculating an estimated completion date for data migrations for each customer according to a total required time for all implementations and the number of people assigned to complete the implementations; and
      displaying the target completion date and estimated completion date for each customer in a user interface.

2. The method of claim 1, wherein the data migration implementations are divided among a number of software products.

3. The method of claim 1, wherein each person assigned to complete an implementation is allotted a specified total amount of work time.

4. The method of claim 3, wherein the work time comprises a total amount of work to perform.

5. The method of claim 3, wherein the work time comprises a total amount of time to spend working on the implementation.

6. The method of claim 1, further comprising displaying for each customer in the user interface:
   the number of people assigned to complete the implementations;
   a total work time completed on the implementations; and
   a completion risk rating according to a comparison of the target completion date and estimated completion date.

7. The method of claim 1, further comprising refreshing previously migrated data at periodic intervals while data migration for a customer is still in progress.

8. The method of claim 1, further comprising:
   tracking a progress status of each task comprising each implementation; and
   responsive to a user selection of an implementation task, displaying in the user interface the progress status of the selected implementation task.

9. The method of claim 8, further comprising, responsive to the user selection of an implementation task, displaying an identity of a person assigned to complete the selected implementation task.

10. The method of claim 1, further comprising receiving input through the user interface to perform at least one of:
    creating a new target completion date for a customer;
    reassigning people to or from implementations; or
    changing an allotted work time for persons assigned to an implementation.

11. The method of claim 1, wherein identifying people from a candidate pool to assign to complete the implementations further comprises:
    modeling the migration implementations based on historical data comprising information about past migration projects;
    modeling performance of people in the candidate pool according to historical data of their past performance;
    comparing models of the migration implementations with models of people in the candidate pool to form a comparison; and
    recommending people from a candidate pool who are best suited to the migration implementations based on the comparison.

12. The method of claim 11, wherein recommending people from the candidate pool occurs on the fly in response to staffing changes or changes in the estimated completion dates that require additional people assigned to migration implementations.

13. A machine learning predictive modeling system for project management, the system comprising:
    a storage device configured to store program instructions;
    a machine learning predictive model; and
    one or more processors operably connected to the storage device and configured to execute the program instructions to cause the system to:
       receive identity of a number of customers requiring data migration;
       receive a target completion date for data migration for each customer;
       identify a number of data migration implementations for all customers;
       perform iterative analysis based on machine learning with a training data based on a historical data set to construct a predictive model;
       update the training data responsive to changes in the historical data set re-train the predictive model with the updated training data;
       determine, with the predictive model, a number of tasks required for each implementation;
       determine, with the predictive model, a required time for completion of each task;
       identify, with the predictive model, a number of people from a candidate pool to assign to complete the data migration implementation;
       assign, with the predictive model, a candidate from the number of people identified, to an implementation team for the data migration implementation;
       calculate an estimated completion date for data migrations for each customer according to a total required time for all implementations and the number of people assigned to complete the implementations; and
       display the target completion date and estimated completion date for each customer in a user interface.

14. The system of claim 13, wherein the data migration implementations are divided among a number of software products.

15. The system of claim 13, wherein each person assigned to complete an implementation is allotted a specified total amount of work time.

16. The system of claim 15, wherein the work time comprises a total amount of work to perform.

17. The system of claim 15, wherein the work time comprises a total amount of time to spend working on the implementation.

18. The system of claim 13, wherein the processors further execute instructions to display for each customer in the user interface:
   the number of people assigned to complete the implementations;
   a total work time completed on the implementations; and
   a completion risk rating according to a comparison of the target completion date and estimated completion date.

19. The system of claim 13, wherein the processors further execute instructions to refresh previously migrated data at periodic intervals while data migration for a customer is still in progress.

20. The system of claim 13, wherein the processors further execute instructions to:
   track a progress status of each task comprising each implementation; and
   responsive to a user selection of an implementation task, display in the user interface the progress status of the selected implementation task.

21. The system of claim 20, wherein the processors further execute instructions to display, responsive to the user selection of an implementation task, an identity of a person assigned to complete the selected implementation task.

22. The system of claim 13, wherein the processors further execute instructions, responsive to receiving input through the user interface, to perform at least one of:
   creating a new target completion date for a customer;
   reassigning people to or from implementations; or
   changing an allotted work time for persons assigned to an implementation.

23. The system of claim 13, wherein identifying people from a candidate pool to assign to complete the implementations further comprises:
   modeling the migration implementations based on historical data comprising information about past migration projects;
   modeling performance of people in the candidate pool according to historical data of their past performance;
   comparing models of the migration implementations with models of people in the candidate pool to form a comparison; and
   recommending people from a candidate pool who are best suited to the migration implementations based on the comparison.

24. The system of claim 23, wherein recommending people from the candidate pool occurs on the fly in response to staffing changes or changes in the estimated completion dates that require additional people assigned to migration implementations.

25. A computer program product for project management, the computer program product comprising:
   a machine learning predictive modeling system; and
   a computer-readable storage medium having program instructions embodied thereon to perform the steps of:
      receiving identity of a number of customers requiring data migration;
      receiving a target completion date for data migration for each customer;
      identifying a number of data migration implementations for all customers;
      performing iterative analysis based on machine learning with a training data based on a historical data set to construct a predictive model;
      updating the training data responsive to changes in the historical data set re-training the predictive model with the updated training data;
      determining, with the predictive model, a number of tasks required for each implementation;
      determining, with the predictive model, a required time for completion of each task;
      identifying, with the predictive model, a number of people from a candidate pool to assign to complete the data migration implementation;
      assigning, with the predictive model, a candidate from the number of people identified, to an implementation team for the data migration implementation;
      calculating an estimated completion date for data migrations for each customer according to a total required time for all implementations and the number of people assigned to complete the implementations; and
      displaying the target completion date and estimated completion date for each customer in a user interface.

26. The method of claim 1, wherein the machine learning comprises at least one of: supervised learning, unsupervised learning, and reinforcement learning.

27. The system of claim 13, wherein the machine learning comprises at least one of: supervised learning, unsupervised learning, and reinforcement learning.

28. The computer program product of claim 25, wherein the machine learning comprises at least one of: supervised learning, unsupervised learning, and reinforcement learning.

29. The method of claim 1, wherein the historical data set comprises at least one of: past migration projects, past performance of staff personnel implementing migration projects, current migration projects, current performance of staff personnel implementing migration projects, and the current candidate pool.

30. The system of claim 13, wherein the historical data set comprises at least one of: past migration projects, past performance of staff personnel implementing migration projects, current migration projects, current performance of staff personnel implementing migration projects, and the current candidate pool.

31. The computer program product of claim 25, wherein the historical data set comprises at least one of: past migration projects, past performance of staff personnel implementing migration projects, current migration projects, current performance of staff personnel implementing migration projects, and the current candidate pool.

* * * * *